US008041394B2

(12) United States Patent
Awater et al.

(10) Patent No.: US 8,041,394 B2
(45) Date of Patent: Oct. 18, 2011

(54) METHODS AND SYSTEMS FOR TRANSMITTING AN INFORMATION SIGNAL IN A MULTIPLE ANTENNA COMMUNICATION SYSTEM (75) Inventors: Geert Arnout Awater, Utrecht (NL); D. J. Richard Van Nee, De Meern (NL)

(73) Assignee: Agere Systems Inc., Allentown, PA (US)

( * ) Notice: Subject to any disclaimer, the term of this patent is extended or adjusted under 35 U.S.C. 154(b) by 1849 days.

(21) Appl. No.: 11/146,511

(22) Filed: Jun. 7, 2005

(65) Prior Publication Data

US 2005/0227735 A1    Oct. 13, 2005

Related U.S. Application Data

(63) Continuation of application No. 09/849,089, filed on May 4, 2001, now Pat. No. 6,922,570.

(30) Foreign Application Priority Data

May 5, 2000    (EP) .................................... 00303793

(51) Int. Cl.
    *H04M 1/00*    (2006.01)
(52) U.S. Cl. ................. 455/562.1; 455/67.11; 455/226.2
(58) Field of Classification Search .................. 455/561, 455/561.2; 370/210, 312
    See application file for complete search history.

(56) References Cited

U.S. PATENT DOCUMENTS

| | | | | |
|---|---|---|---|---|
| 5,260,968 A | * | 11/1993 | Gardner et al. | 375/347 |
| 5,592,490 A | * | 1/1997 | Barratt et al. | 370/310 |
| 5,642,353 A | * | 6/1997 | Roy et al. | 370/329 |
| 5,914,933 A | * | 6/1999 | Cimini et al. | 370/208 |
| 6,327,314 B1 | * | 12/2001 | Cimini et al. | 375/340 |
| 6,359,923 B1 | * | 3/2002 | Agee et al. | 375/130 |
| 7,133,456 B2 | * | 11/2006 | Feher | 375/259 |

FOREIGN PATENT DOCUMENTS

| | | | |
|---|---|---|---|
| EP | 0938194 | | 8/1999 |
| WO | WO 98/09381 | * | 3/1998 |
| WO | WO98/27669 | | 6/1998 |
| WO | WO99/45657 | | 9/1999 |
| WO | WO99/57820 | | 11/1999 |

OTHER PUBLICATIONS

Y. Li et al., "Adaptive Antenna Arrays for OFDM Systems With Cochannel Interference," *IEEE Transactions on Communications*, vol. 47, No. 2, pp. 217-229 (Feb. 1999).

* cited by examiner

*Primary Examiner* — Temica M Beamer (57) ABSTRACT

Methods and systems are provided for transmitting a plurality of information signals in a multiple antenna communication system. One or more information signals are coded using a plurality of coders to generate the plurality of coded information signals and an Inverse Fast Fourier Transformation is performed on each of the plurality of coded information signals to create a corresponding output signal. Each of the corresponding output signals are transmitted on a different antenna. Each of the plurality of coded information signals can optionally be separated into K signals. On the receiver side, a signal comprising K different frequencies is received on at least N receive antennas and a Fast Fourier Transformation is applied to each of the at least N received versions of the signal comprising K different frequencies to generate N*K low frequency signals. The N*K separate low frequency signals are then combined to recover a transmitted information signal, based on one or more transfer functions from each of a plurality of transmit antennas to each of the N receive antennas.

26 Claims, 4 Drawing Sheets

METHODS AND SYSTEMS FOR TRANSMITTING AN INFORMATION SIGNAL IN A MULTIPLE ANTENNA COMMUNICATION SYSTEM

CROSS-REFERENCE TO RELATED APPLICATIONS

This application is a continuation of U.S. patent application Ser. No. 09/849,089, filed May 4, 2001, now U.S. Pat. No. 6,922,570 entitled "Increased Data Communication Capacity of a High Rate Wireless Network," which itself claims priority of European Patent Application No. 00303793.4, filed on May 5, 2000, each of which are incorporated by reference herein.

The invention relates to a wireless radiofrequency data communication system comprising:

- a base-station comprising multiple first sets and a signal processing-unit, wherein each first set comprises a transmitter- and receiver-unit provided with a transmitter and a receiver and at least one antenna which is connected to the transmitter- and receiver-unit, wherein the signal processing-unit is connected with each of the first sets for processing signals received by the first sets and processing signals to be transmitted by the first sets, and
- multiple second sets, wherein each second set comprises a transmitter- and receiver-unit provided with a transmitter and a receiver and at least one antenna which is connected to the transmitter- and receiver-unit. This system may be a full duplex communication system.

The invention relates also to a wireless radiofrequency data communication system comprising in use:

- $k_1$ multiple first groups, wherein each first group comprises a transmitter-unit and at least one antenna which is connected to the transmitter-unit for transmitting a signal; and
- $k_2$ multiple second groups, wherein each second group comprises a receiver-unit and at least one antenna which is connected to the receiver-unit. This system may be limited to a simplex communication system.

Wireless radiofrequency data communication systems of this type are known and find their applications in a variety of fields. An example of such an application can be found in the domain of digital communication for electronic-mail. In this application each personal computer can be provided with at least one second set so that the personal computer can be incorporated in an network. The base-station may in that case be connected with a server of the network. Further examples are given, for instance, in the domain of mobile telephony. In the case of mobile telephony the base-station is a telephony exchange. In the majority of the applications more than one second set wants to communicate with the base-station. This means that the second set transmits signals to this base-station and also receives signals from this base-station. Since it would not be acceptable if all second sets would have to wait for each other's communication to be finished, there is a need for simultaneous communication. Simultaneous communication allows more second sets to communicate at the same time with the base-station. A straightforward and common way of realising simultaneous communication is to assign different radiofrequencies to the respective second sets. In this way all data signals can be separated easily by the first sets in the base-station by frequency selective filters. Furthermore, the base-station can communicate with each second set at the specific radiofrequency which has been assigned to the second set. A transmitted radiofrequency signal contains the actual information to be transmitted to the receiver. This actual information has been modulated on the radiofrequency carrier-signal. Several techniques have been developed for modulating information on the carrier-signal like frequency-modulation, phase-modulation amplitude-modulation et cetera. It is an object of the invention to increase the capacity of the wireless communication system per frequency or frequency-band used by the system.

The present invention therefore provides in a wireless radiofrequency data communication system which is characterised in that the signal processing-unit comprises information about the transfer-functions of radiofrequency signals from each of the antennas of the first sets to each of the antennas of the second sets and/or vice versa, and wherein the transmitters and receivers, both in the first sets and in the second sets, operate on essentially the same radiofrequency or radiofrequency-band, and wherein the signal processing-unit processes the signals received by the first sets and processes the signals to be transmitted by the first sets on the basis of said transfer functions such that for each second set of a plurality of the second sets an individual communication channel is formed with the base-station wherein these communication channels are generated simultaneously and separately from each other.

In this manner multiple communication channels are realised on the same frequency, or within the same frequency-band, based on the principle that the signals can be separated thanks to the different characteristics of the transfer-functions. Hence the capacity per frequency or frequency-band is indeed increased. The geometry of the configuration of the communication system determines the transfer functions which belong to the different travel-paths between the antennas of the first sets and the second sets in the base-station. These transfer functions are expressed by complex numbers. Each complex number expresses the transfer function between one antenna of one of the first sets and one antenna of the second set. The amplitude of the complex number is the attenuation of the signal's strength and the phase of the complex number is the phase modulation incurred during transmission along the travel-path. Since the used frequencies are relatively high, the transfer functions depend largely on the configuration. The system according to the present invention can be used as a full duplex communication system.

A special embodiment according to the invention is characterised in that the number of first sets is N and, in use, the number of second sets is M, wherein N is greater than M, wherein the signal processing-unit is provided with an input-port for imputing M signals to be received by the respective M second sets, wherein the processing unit is arranged to process the M signals in combination on the basis of the information of the transfer-functions to obtain N transmit-signals which are fed to the respective N first sets for being transmitted by the first sets to the second sets and wherein the processing unit is arranged to process the M signals in combination in such a way that the M signals are received separately by the respective M second sets if the second sets each receive the N transmit-signals, thereby establishing M of said simultaneous communication channels. According to this special embodiment transmission of data-signals to the respective second sets can be performed in a very accurate way. Preferably this embodiment is further characterised in that the processing unit is arranged to, in use, process, on the basis of the information about the transfer-functions H, the M signals Q to obtain the N transmit-signals R, to be transmitted by the first sets, according to $$R = P_D Q, \tag{I}$$

resulting in that the M signals Q are received separately by the respective second sets if the second sets each receive the N transmit-signals, where $P_D = [H^*(H^* H)^{-1}]^T$ is the pseudo-inverse for $H^T$ and where $H^*$ is the complex conjugated and transposed of H, wherein H is a complex [N*M] matrix containing transfer functions $h_{ij}$ (i=1, ..., N; j=1, ..., M), wherein $h_{ij}$ is the transfer function for transmission from the $j^{th}$ second set of the M second sets to the $i^{th}$ first set of the N first sets, and where Q is a complex M dimensional vector $[Q_1, Q_2, ..., Q_j, ..., Q_M]^T$ wherein $Q_j$ is the signal to be transmitted to the $j^{th}$ second set of the M second sets and where $R=[R_1, R_2, ..., R_i, ..., R_N]^T$ wherein $R_i$ is the transmit-signal to be transmitted by the $i^{th}$ first set of the N first sets.

A further embodiment according to the invention is characterised in that the number of first sets is N and, in use, the number of second sets is M, wherein N is greater than M, wherein, in use, each of the M second sets transmits a signal so that M signals are transmitted to be received in combination by the first sets wherein the signal processing-unit is arranged to process in combination signals received by each of the first sets on the basis of the information about the transfer-functions to recover the M signals transmitted by the M second sets separately from each other, thereby obtaining M of said simultaneous communication channels. According to this embodiment M signals can be transmitted from the respective second sets to be individually recovered by the base-station in a very accurate way. Preferably this embodiment is further characterised in that the processing unit is arranged to, in use, process, on the basis of the information about the transfer-functions H, the signals r which are received by the first sets, to calculate an estimation x_est of the M signals $x^c$ which were transmitted by the M second sets, according to the mathematical expression $$x\_est = P_U r, \qquad (II)$$

where $P_U = [(H^*H)^{-1} H^*]$ is the pseudo-inverse for H and where $H^*$ is the complex conjugated and transposed of H, wherein H is a complex [N*M] matrix containing transfer functions $h_{ij}$ (i=1, ..., N; j=1, ..., M), wherein $h_{ij}$ is the transfer function for transmission from the $j^{th}$ second set of the M second sets to the $i^{th}$ first set of the N first sets, r is a complex N dimensional vector $[r_1, ..., r_i, ..., r_N]^T$ with $r_i$ the signal received by the $i^{th}$ first set of the N first sets, x_est is a complex M dimensional vector [x_est$_1$, ..., x_est$_j$, ..., x_est$_M$]$^T$ where x_est$_j$ is an estimation of $x^c_j$, and where $x^c$ is a complex M-dimensional vector $[x^c_1, ..., x^c_j, ... x^c_M]^T$, with $x^c_j$ being the signal transmitted by the $j^{th}$ second set of the M second sets. Equation (II) is based on the model (III)

$$r = Hx^c + n, \qquad (III)$$

where n is a complex N-dimensional vector containing noise terms picked up during reception.

Additionally, in this embodiment of the invention, the base-station can, according to equation (II), suppress noise in the signals which are transmitted by the second sets. This is of importance since mostly the second sets will comprise mobile transmitters which are not able to transmit high-power signals. The base-station on the other hand will possess enough power to transmit signals with a relative high amplitude, noise reduction at the side of the second sets is therefore of less importance.

Depending on the travel-path and the specific radiofrequency used, the transmitted signal may suffer from fading. This can be rather serious, even resulting in that such a signal may lack the strength to be properly received. Knowledge of the transfer-functions can serve in preventing the use of those frequencies which suffer too much from fading for a particular travel-path.

An advantageous embodiment of the data communication system according to the invention is characterised in that each second set comprises a serial-to-parallel/parallel-to-serial unit, which unit, in use, splits the data signal of said second set in a multiple of signals, and means for modulating these signals on different frequencies according to the Inverse Fast Fourier Transformation, and wherein each first set comprises a unit for executing a Fast Fourier Transformation on the signal received by said first set and means for combining the transformed signals in order to recover said data-signal. This is the concept of the Orthogonal Frequency Division Multiplexing (OFDM) technique. The OFDM technique can be applied for preventing Inter-Symbol Interference (ISI). The ISI effect is the effect wherein symbols interfere with each other as a consequence of differences in travel-path lengths, for instance caused by the multipath phenomenon. This can be illustrated with the following example: At a symbol rate of say 10 [Mega-symbols/second] and a maximum delay spread of say 100 [ns] each symbol smears out over two symbol intervals, resulting in a significant amount of ISI. This ISI effect may be prevented by cyclically extending the symbol interval with a guard interval which is larger than the delay spread. The OFDM technique has in the system according to the invention as a further advantage that the effects of frequency selective fading are strongly reduced. Delay spread causes different attenuations for the N different signals r received by the first sets. Some of the received signals $r_i$ may be in a deep fade, thereby degrading the overall bit error probability. The conventional approach to fix this problem is to apply forward error correction coding across the received signals $r_i$, such that a few erroneous received signals $r_i$ can be corrected. With the present multi-antenna processing, the probability of deep fades is greatly reduced because of the antenna receiving diversity effect. Hence the combination of multi-antenna processing and OFDM also reduces or eliminates the problem of frequency selective fading. In short: The combination of multi-antenna processing according to the present invention and OFDM for each signal which is transmitted by the second set $14.j$ has the advantages that ISI is avoided and that no or less coding redundancy is required compared to a single antenna OFDM system. Hence the application of OFDM will considerable limit the number of erroneous signals. This is of special interest for the data communication capacity since signals which have not been received correctly, which will be detected with a redundancy check, have to be transmitted again. This will cost a lot of overhead according according to the communication protocol and will reduce the overall data communication capacity.

Yet the system of the invention which may be limited to a simplex communication system is a wireless radiofrequency data communication system comprising in use:

$k_1$ multiple first groups, wherein each first group comprises a transmitter-unit and at least one antenna which is connected to the transmitter-unit for transmitting a signal; and $k_2$ multiple second groups, wherein each second group comprises a receiver-unit and at least one antenna which is connected to the receiver-unit, characterised in that, the wireless radiofrequency data communication system further comprises a signal processing-unit which is, if $k_1 > k_2$, connected to each of, the first groups and which is, if $k_1 < k_2$, connected to each of, the second groups, wherein the signal processing-unit comprises information about the transfer-functions of radiofrequency signals from each of the first groups to each of the second groups and/or vice versa, and wherein, each of the transmitter-units, of the first groups operates on essentially the same radiofrequency or radiofrequency band, and wherein, in use, if $k_1 > k_2$, the signal processing-unit processes $k_2$ data-signals to be transmitted to the $k_2$ second groups for obtaining $k_1$ signals which are supplied to the respective first groups to be transmitted, wherein the $k_2$ data signals are processed on the basis of said transfer functions in such a manner that the respective second groups will receive separately the respective $k_2$ data-signals, thereby establishing $k_2$ simultaneous communication channels, and wherein, in use, if $k_1 < k_2$, the signal processing-unit processes $k_2$ signals, which are received by the respective second groups on the basis of said transfer functions in such way that an estimation is made of the $k_1$ signals transmitted by the first groups, thereby establishing $k_1$ simultaneous communication channels. Additionally, this overall data communication system can also be carried out with the concept of the so-called Orthogonal Frequency Division Multiplexing (OFDM) method.

In the accompanying drawings, in which certain modes of carrying out the present invention are shown for illustrative purposes.

Figure 1:
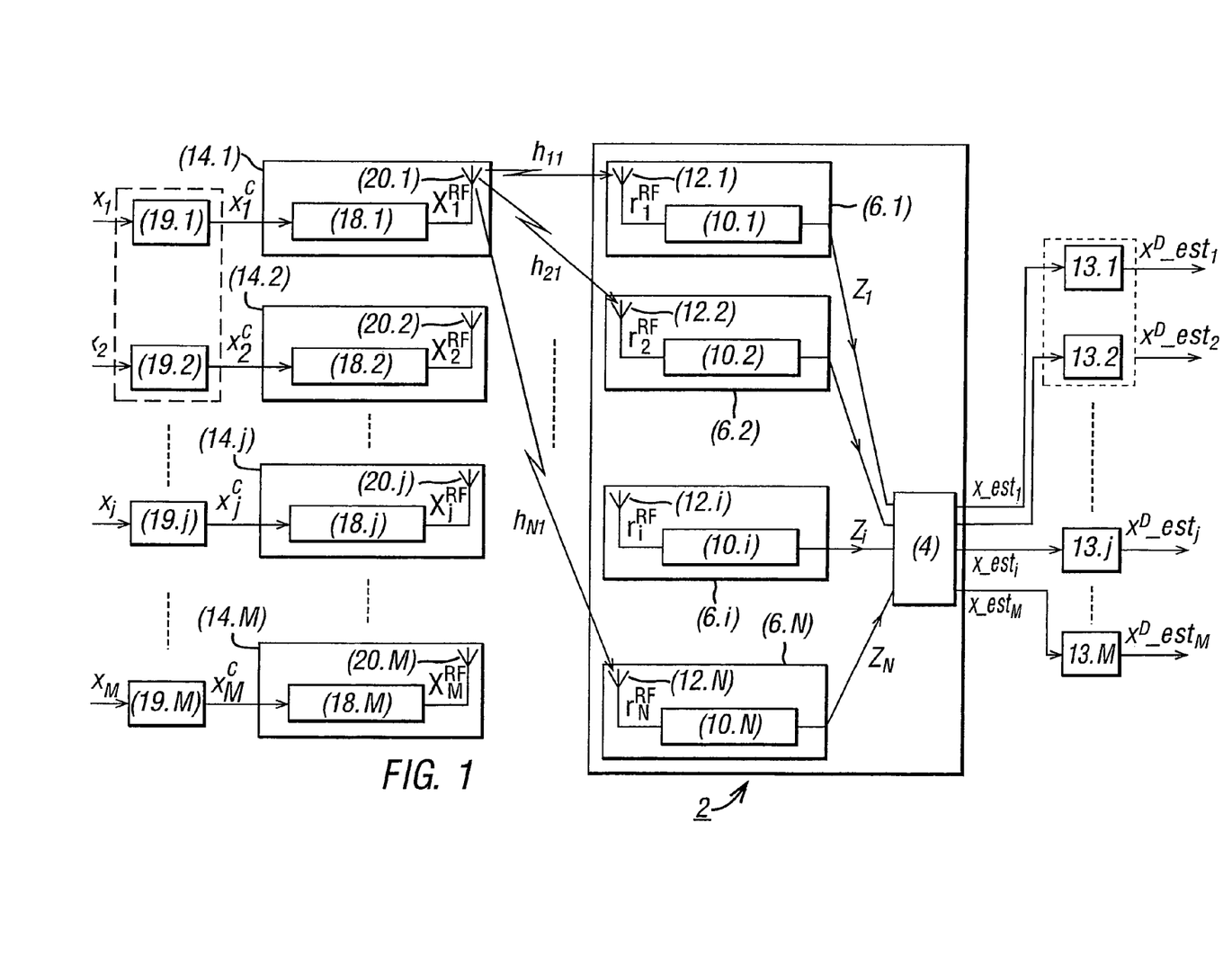
FIG. 1 is a diagram showing a wireless data communication system operating at one specific radiofrequency in the uplink situation.

An embodiment of a wireless radiofrequency data communication system according to the invention is shown in FIG. 1. This wireless radiofrequency data communication system comprises a base-station 2 which comprises a signal processing-unit 4 and multiple first sets 6.$i$ ($i=1, 2, \ldots, N$). Each first set 6.$i$ comprises a transmitter- and receiver-unit 10.$i$, comprising a transmitter and a receiver, and at least one antenna 12.$i$ which is connected to the transmitter- and receiver-unit 10.$i$. In this example each first set 6.$i$ comprises one antenna 12.$i$ connected to the transmitter- and receiver-unit 10.$i$. The signal processing-unit 4 is at one side connected to each of the first sets 6.$i$, $i=1, 2, \ldots, N$, and at another side connected to each of the coding/decoding-units 13.$j$, $j=1, 2, \ldots, M$. Furthermore, the system comprises multiple second sets 14.$j$ ($j=1, 2, \ldots, M$), wherein each second set 14.$j$ comprises a transmitter- and receiver-unit 18.$j$ and at least one antenna 20.$j$ which is connected to said transmit- and receive unit 18.$j$. Each of the second sets 14.$j$ is connected with a coding/decoding-unit 19.$j$, $j=1, 2, \ldots, M$.

Figure 2:
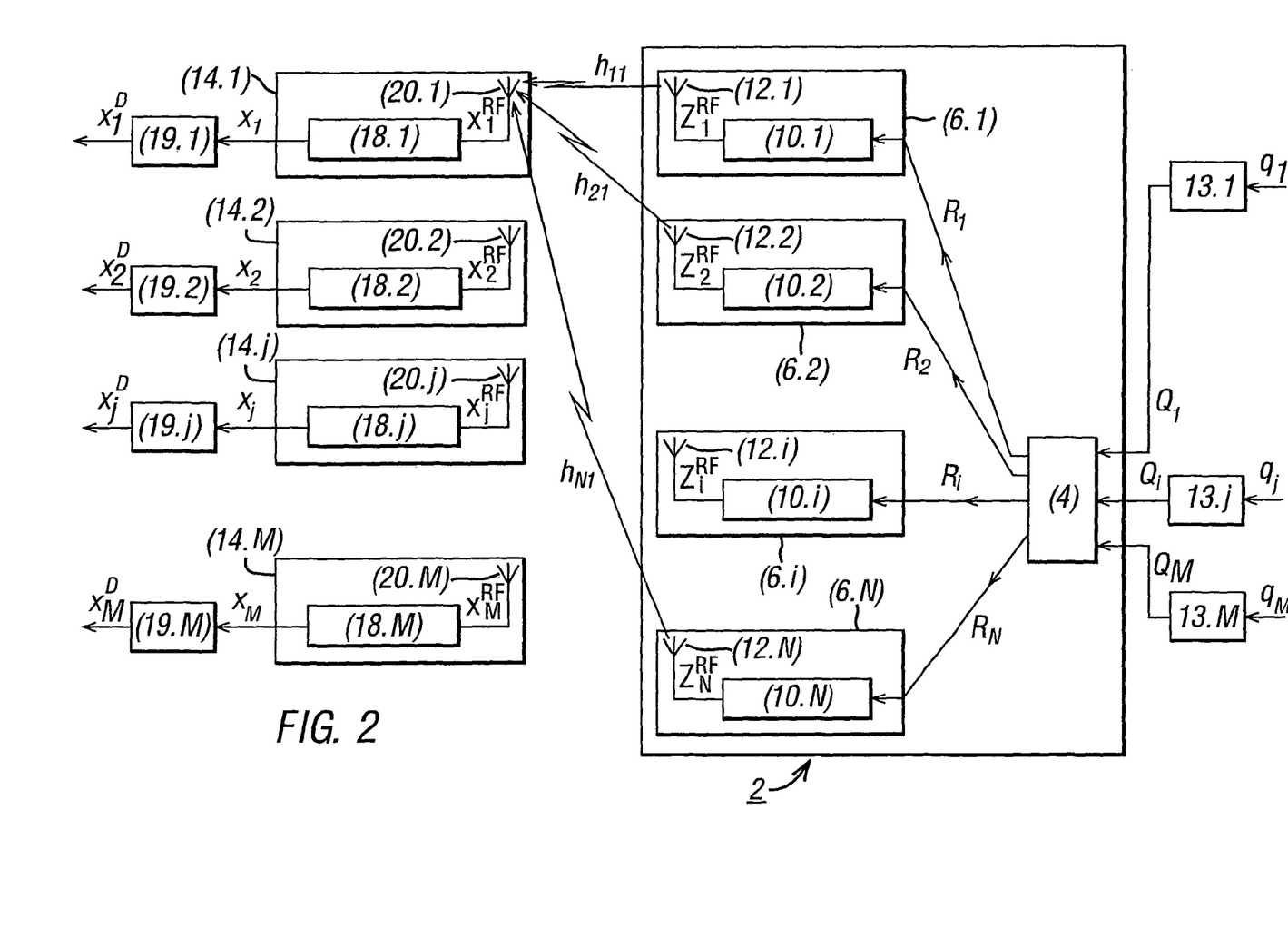
FIG. 2 is a diagram showing a wireless data communication system operating at one specific radiofrequency in the downlink situation.

The first sets 6.$i$ in the base-station 2 can transmit and receive signals to/from the second sets 14.$j$. The situation wherein signals are transmitted from the second sets 14.$j$ to the first sets 6.$i$ in the base-station 2 is called uplink, this is the situation depicted in FIG. 1. Transmission of signals from the first sets 6.$i$ in the base-station 2 to the second sets 14.$j$ is called downlink, this is illustrated in FIG. 2. In the configurations of FIG. 1 and FIG. 2 there are N first sets 6.$i$ in the base-station 2 and, in use, M second sets 14.$j$. (The number M of second sets 14.$j$ which are actually used may vary). Hereby it is possible that each second set 14.$j$ belongs to one user, but it is equally possible that one user uses more than one second set 14.$j$. It is even thinkable that one user uses all second sets. Mostly the base-station will be connected to a server, for instance an internet and/or intranet server for establishing wireless connections with and between mobile notebooks. Each of these mobile notebooks is provided with at least one second set.

In the uplink situation (FIG. 1) a radiofrequency transmission signal $x^{RF}_j$ is generated by the second set 14.$j$ and subsequently transmitted to the first sets 6.$i$ ($i=1, \ldots, N$). Each signal $x^{RF}_j$ contains the modulated information of data-signal $x_j$. The data-signal $x_j$ is the input to the coding/decoding unit 19.$j$, the output of this unit is the low-frequency signal $x^C_j$. The first function in the uplink situation of the coding/decoding unit 19.$j$ is to modulate data-signal $x_j$ on a carrier-signal, which yields the low-frequency signal $x^C_j$. (Examples of methods of modulation are amplitude modulation and phase modulation. These kinds of modulation are known). A possible second function of the coding/decoding unit 19.$j$ is to apply Forward Error Correction. (The technique of Forward Error Correction is known). Moreover, if desired, some of the coding/decoding units 19.$j$ can be combined into a single coding/decoding unit. This is schematically indicated in FIG. 1 with the dotted line which combines the units 19.1 and 19.2). The transmitter- and receiver-unit 18.$j$, which comprises a radiofrequency-modulation and a radiofrequency-demodulation function, modulates the output $x^C_j$ of the coding/decoding unit 19.$j$ on a radiofrequency-carrier signal which leads the radiofrequency transmission signal $x^{RF}_j$. The signals $x^{RF}_j$ ($j=1, \ldots, M$) are transmitted simultaneously by the second sets 14.$j$ to all first sets 6.$i$ ($i=1, \ldots, N$). As a consequence of this, each of the first sets 6.$i$ receives a radiofrequency signal $r^{RF}_i$. This signal $r^{RF}_i$ is in fact a combination of the transmitted signals. In each of the transmitter- and receiver units 10.$i$ of the first sets 6.$i$ the first step is the removal of the carrier frequency (which is radiofrequency-demodulation by the transmitter-receiver-unit 10.$i$) this yields the low frequency signals $r_i$, $i=1, 2, \ldots, N$. Then, each signal $r_i$ is passed to the signal processing-unit 4. The signal processing-unit receives N input signals $r_i$ and generates M output signals $x\_est_j$. The operation of the signal processing-unit will be described later. The N input signals $r_i$ and the M output signals $x\_est_j$ of the signal processing unit 4 can be analogue as well as digital. In this example these signals are analogue low frequency signals. The signal $x\_est_j$ is fed to the coding/decoding unit 13.$j$ ($j=1, 2, \ldots, M$), which unit has as a main function to perform demodulation of the signal $x\_est_j$, yielding the information-signal $x^D\_est_j$ in bits form. The signal $x^D\_est_j$ is equal, or approximately equal, to $x_j$. A possible function of the coding/decoding units 13.$j$ and 19.$j$ is the application of Forward Error Correction. It is also noted here that, if desired, some of the units 13.$j$ can be combined in a single unit. This is illustrated schematically for coding/decoding units 13.1 and 13.2 in FIG. 1 with the dotted line.

In the downlink situation (FIG. 2), firstly each of the coding/decoding units 13.$j$ ($j=1, 2, \ldots, M$) gets an input data-signal $q_j$ ($j=1, 2, \ldots, M$). This data-signal $q_j$ contains the information to be transmitted in the form of bits. (The signals $q_j$ are the respective data-signals to be transmitted to the respective second sets 14$_j$ ($j=1, 2, \ldots, M$)). Next, the input-signal $q_j$ is modulated into a low frequency signal $Q_j$ by the coding/decoding unit 13.$j$. The signal processing unit 4 generates N output signals $R_i$ ($i=1, \ldots, N$) on the basis of these M low frequency signals $Q_j$, $j=1, \ldots M$. The signals $R_i$ are passed to the first sets 6.$i$ and more specifically to the transmitter- and receiver-units 10.$i$ of these first sets 6.$i$. These transmitter- and receiver-units generate the radiofrequency transmission signals $Z^{RF}_i$ ($i=1, \ldots, N$), which signals are transmitted to the second sets 14.$j$. Antenna 20.$j$ of each second set 14.$j$ receives a signal $X^{RF}_j$, which signal is in fact a combination of the transmitted signals. This signal is radiofequency-demodulated by the transmitter- and receiver-unit 18.$j$ ($j=1, 2, \ldots, M$), which means that the radiofrequency-carrier signal is removed from the signal $X^{RF}_j$. The low-frequency output signal $X_j$ of the transmitter- and receiver-unit $18.j$ is the input signal of the coding/decoding unit $19_j$ (j=1, 2, ..., M). The coding/decoding unit $19.j$ demodulates the signal $X_j$ which yields the data signal $X^D_j$ (in bits) which is equal (or approximately equal) to $q_j$ (j=1, 2, ..., M).

In the uplink situation (FIG. 1) radiofrequency signals $x^{RF}_j$ may travel along a selection of so-called travel-paths $T_{ij}$, i=1, 2, ..., N; j=1, 2, ..., M. The travel-path $T_{ij}$ is defined as the travel-path between the antenna $12.i$ and the antenna $20.j$. Since all signals $x^{RF}_j$ are transmitted on essentially the same frequency, for each travel-path $T_{ij}$ a transfer-function can be defined which is expressed in a complex number $h_{ij}$. The amplitude of this complex number $h_{ij}$ is the attenuation of the transmitted signal and the phase of this complex number $h_{ij}$ is the phase distortion of the transmitted signal during transmission from the antenna $20.j$ to the antenna $12.i$ and vice versa. All elements $h_{ij}$ (i=1, ..., N; j=1, ..., M) are stored in a [N*M] matrix H. This matrix H is called the transfer-function. The transfer-function H is important since the information, which is modulated on a radiofrequency signal by phase and/or amplitude modulation, can accurately be recovered if the receiver can correct for the amplitude and/or phase distortion which has occured during transmission. It is supposed that the transfer function H is known by the signal processing-unit 4. The transfer-function has to be measured regularly by the data communication system. Below, the use of the transfer-function H and the procedure (which is known per se) of measuring the transfer-function is elucidated. The transfer function for downlink is the transposed of the transfer function for uplink. So, if the transfer function for uplink is known then the transfer function for downlink is known also.

The initiation of the calculation (or calibration) of the transfer-functions can be controlled by the signal processing-unit 4. In a particular algorithm all antennas (of the first and second sets) but one antenna $20.j$ of one second set $14.j$ are forced to be silent, wherein the one antenna $20.j$ transmits a calibration signal to the antennas $12.i$ of the first sets $6.i$. The signal which is received by the first set $6.i$ is a measure for the transfer function $h_{ij}$ (i=1, 2, ..., N). This procedure can be repeated for all other antennas of the second sets. Afterwards the transfer-functions are known by combining the information gathered in this manner. Since the used frequencies are relatively high, the transfer-functions depend largely on the configuration. This implicates that the transfer-functions have to be updated with a fairly high rate.

According to the invention multiple simultaneous communication channels may be generated on essentially one radiofrequency, both for uplink and downlink, between the first sets $6.i$ of the base-station 2 and the second sets $14.j$. For this, use is made of the knowledge the transfer-function H. The generation of multiple simultaneous communication channels significantly increases the data transmission capacity of the wireless data communication system relative to other systems using the same frequency. The generation of simultaneous communication channels will be explained in detail below, first for the uplink situation and then for the downlink situation. All necessary calculations are performed by the signal processing-unit 4, which is in this particular embodiment situated in the base-station 2.

Now the role of the signal processing unit 4 in the uplink situation (FIG. 1) will be explained in more detail. In the uplink situation the signal processing unit 4 establishes M simultaneous communication channels. This is accomplished as follows: The coding/decoding unit $19.j$ provides the second sets $14.j$ with low-frequency signals $x^C_j$ on the basis of the data-signals $x_j$. (This is done for all second sets j=1, ..., M).

These signals have to be transmitted to the base-station. Therefore, the respective M second sets $14.j$ transmit the respective M radiofrequency data signals $x^{RF}_j$ (j=1, 2, ..., M), containing the respective coded information of data signals $x_j$, simultaneously to the N first sets $6.i$ (i=1, 2, ..., N). Next, the first sets $6.i$ (i=1, ..., N) generate the signals $r_i$ (i=1, 2, ..., N). (The $i^{th}$ first set of the N first sets generates signal $r_i$). The signal processing unit receives N input signals $r_i$ which may be noted as a N-dimensional vector $r=[r_1, ..., r_N]^T$. On the basis of these input signals, the signal processing-unit calculates estimation signals for the signals $x^C_j$ according to an estimation algorithm. The output of the signal processing-unit are these estimation signals $x\_est_j$ (j=1, 2, ..., M) which may be noted as a M-dimensional vector $x\_est=[x\_est_1 ... x\_est_M]^T$.

During transmission and reception noise will be picked up by the reception signals $r^{RF}_i$, this noise will accumulate in a noise term $n_i$ in $r_i$. These noise terms may be noted as a N-dimensional vector $n=[n_1 ... n_N]^T$. Since N>M the signals x can be recovered by the estimation algorithm. This estimation algorithm is based on the mathematical model (IV).

$$r=Hx^C+n, \qquad (IV)$$

where H is a complex [N*M] matrix containing the transfer functions $h_{ij}$ for uplink. The vector $x^c$ is a M dimensional vector $x^c=[x^c_1, x^c_2, ..., x^c_j, ..., x^c_M]^T$ where $x^c_j$ is the low frequency signal which is transmitted by the second set $14.j$. Note that the low-frequency signal $x^c_j$ actually has to be modulated on a radiofrequency carrier for being able to be transmitted by the second sets, this modulation leads the signal $x^{RF}_j$. Each component of $x^c$ is one communication channel. The signal processing-unit calculates the M-dimensional estimation vector $x\_est$ of the transmitted signal $x^c$ according to the mathematical least-squares estimation based on formula (V)

$$x\_est=P_U r, \qquad (V)$$

where $P_U=[(H^*H)^{-1} H^*]$ is the pseudo-inverse for H and where $H^*$ is the complex conjugated and transposed of H. In this way, according to (V), M simultaneous communication channels for uplink are obtained. The estimation algorithm also brings along a valuable effect of noise suppression because the noise contribution in $r_i$ can be quite serious since the second sets will not always dispose of powerful transmitters.

Now the role of the processing unit 4 in the downlink situation will be elucidated. In the downlink situation (FIG. 2) the input of the signal processing-unit is fed with the M low frequency signals $Q_j$. As will be explained, each of the signals $Q_j$ is a communication channel. The low-frequency signals $Q_j$ may be noted as a M-dimensional vector $Q=[Q_1, ..., Q_M]^T$. In the downlink situation M simultaneous communication channels are generated by the signal processing unit 4 in the following way. On the basis of Q the signal processing-unit generates the N output signals $R_i$ (i=1, ..., N) which may be noted as a N-dimensional vector $R=[R_1 ... R_N]^T$. Note that the low-frequency signal $R_i$ actually has to be modulated on a radiofrequency carrier for being able to be transmitted by the first sets, this modulation leads the signal $Z^{RF}_i$. During reception in the first sets $14.j$ (j=1, ..., M) the received signal $X^{RF}_j$ will be incurred with noise. The noise contribution in the received signal $X_j$ is noted as $E_j$ (j=1, 2, ..., M). A noise vector may be noted as follows $E=[E_1 ... E_M]^T$. The signal processing-unit 4 calculates such a signal R that the signals $X_j$ in the second sets $14.j$ are equal (or approximately equal in case of noise) to the respective low-frequency signals $Q_j$ (j=1, 2, ..., M). This procedure is elaborated with the following mathematical expression:

$$R = P_D Q \qquad (VI)$$

In (VI) the signal R is expressed in terms of the low-frequency signal Q, wherein $P_D = [H^*(H^*H)^{-1}]^T$ is the pseudo-inverse for $H^T$, and where $H^*$ is the complex conjugated and transposed of H, wherein H is a complex [N*M] matrix containing the transfer functions $h_{ij}$ for transmission from the second sets to the first sets. The signal X, which is a M-dimensional vector $[X_1, \ldots, X_M]$, is the output of the second sets and is given by $$X = H^T P_D Q + E = Q + E \qquad (VII)$$

where $H^T$ is the transfer function for downlink (since H is the transfer function for uplink). So, indeed M simultaneous communication channels for downlink are obtained if the signal processing-unit converts the low-frequency signals Q into the signals R according to (VI).

The wireless data communication system as described hereinbefore operates on just one frequency, thereby using multiple simultaneous communication channels (in a duplex mode) at this frequency for increasing the communication capacity. This concept can be exploited at a greater extend by using a system according to the invention which operates at a frequency-band. This concept is particularly suited for being used in combination with the Orthogonal Frequency Division Multiplexing (OFDM) method. The OFDM method, which is known per se, is applied in practice for preventing the transmitted symbols from Inter-Symbol Interference (ISI) effects and for reducing fading effects which occur, strongly dependant of the used radiofrequency, during transmission. The multi-antenna processing technique combined with the OFDM technique (explained below) yields two important advantages. The first advantage of OFDM is that the Inter-Symbol Interference (ISI) is significantly reduced. ISI is the effect wherein symbols interfere with each other as a consequence of differences in travel-path lengths, for instance caused by the multipath phenomenon. According to the OFDM method a single data signal is splitted in multiple signals with a lower data rate, due to this lower data rate the risk of said interference is reduced. The second advantage of OFDM is that the effects of frequency selective fading are strongly reduced. Delay spread causes different attenuations for the N different signals r received by the first sets. Some of the received signals $r_i$ may be in a deep fade, thereby degrading the overall bit error probability. The conventional approach to fix this problem is to apply forward error correction coding across the received signals $r_i$, such that a few erroneous received signals $r_i$ can be corrected. With the present multi-antenna processing, the probability of deep fades is greatly reduced because of the antenna receiving diversity effect. Hence the combination of multi-antenna processing and OFDM also reduces or eliminates the problem of narrowband fading.

Figure 3:
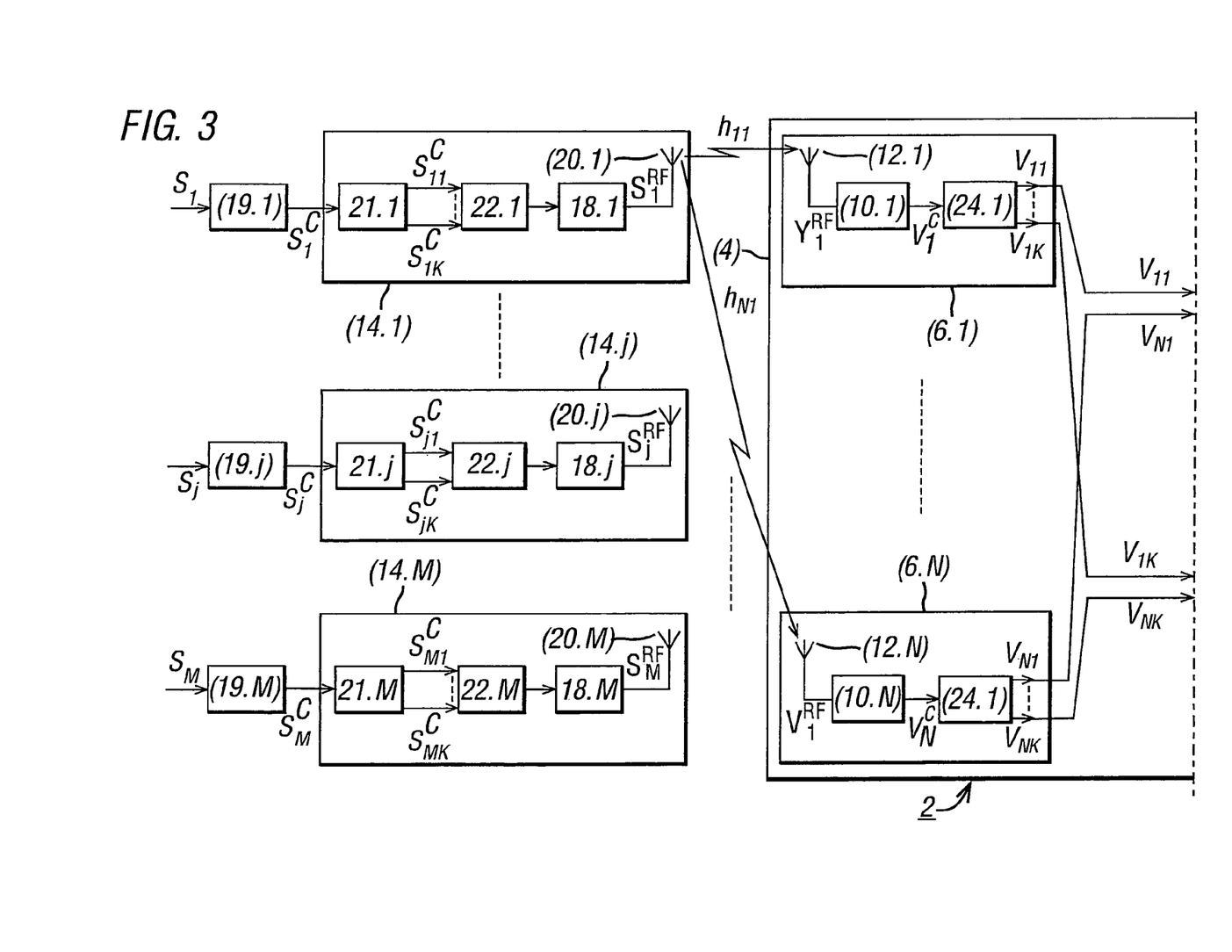
FIG. 3 is a diagram showing a wireless data communication system which operates on a frequency-band.

The principle of using a frequency-band in combination with OFDM will now be described for the uplink situation as is shown in FIG. 3. In FIG. 3 the geometry of the first sets 6.i lodged in the base-station 2, the second sets 14.j, the coding/decoding units 13.j and 19.j, the transmitter- and receiver-units 18.j and 10.i are all comparable with the embodiments of FIGS. 1 and 2. In the FIGS. 1-3 similar elements have been indicated with the same reference numbers. The input to the coding/decoding unit 19.j (j=1, ..., M) is the data-signal $S_j$, this signal contains the information (for example in bits) which has to be transmitted to the first sets 6.i (i=1, ..., N) in the base station 2. The output of the coding/decoding unit 19.j is the low-frequency signal $S^C_j$ (j=, ..., M). The second sets 14.j in FIG. 3 also comprise a serial-to-parallel/parallel-to-serial unit 21.j. The input for this unit is the low frequency signal $S^C_j$. In the serial-to-parallel/parallel-to-serial unit 21.j the signal $S^C_j$ is splitted in K signals $[S_{j1}, \ldots, S_{jK}]$. Furthermore, the second set 14.j comprises a Fast-Fourier-Transform/Inverse-Fast-Fourier-Transform (FFT/IFFT) unit 22.j. In the uplink situation the unit 22.j receives said K signals at its input and performs an Inverse Fast Fourier Transformation yielding a signal comprising K different frequencies. This signal is fed to the transmitter- and receiver-unit 18.j for transmission of a narrow-band transmission radiofrequency signal $S^{RF}_j$ (j=1, 2, ..., M) to be received by the first sets 6.i (i=1, 2, ..., M). The received signals of the first sets 6.i are noted by $V^{RF}_i$ (i=1, 2, ..., N). The transmit- and receive-units 10.i of the first sets 6.i each remove the radiofrequency carrier from the received signals $V^{RF}_i$ to obtain (low frequency) signals $V^C_i$ (i=1, 2, ..., N). The first sets 6.i each comprise a Fast-Fourier-Transform/Inverse-Fast-Fourier-Transform (FFT/IFFT) unit 24.i. In the uplink situation this unit receives the input signal $V^C_i$ which comprises, in principle, K different frequencies, the output comprises K separate low-frequency signals $[v_{i1}, \ldots, v_{iK}]$. The signal processing unit 4 processes the K*N output-signals $v_{ik}$ (i=1, 2, ..., N; k=1, 2, ..., K) of the FFT/IFFT units 24.i (i=1, ..., N). For this, the signal processing unit 4 comprises two types of units: The least squares estimation units 4A.k, k=1, ..., K and the serial-to-parallel/parallel-to-serial units 4B.j, j=1, ..., M. The least squares units 4A.k are each analogous to the "single-frequency signal processing unit" 4 in FIGS. 1 and 2. Each least squares unit 4A.k receives N input signals $v_{ik}$ (i=1, 2, ..., N) from the first sets 6.i. The output of each unit 4A.k consists of M estimation signals. These estimation signals are combined is such a way that the output signal of the $j^{th}$ serial-to-parallel/parallel-to-serial unit 4B.j is given by $S\_est_j = [s\_est_{j1}, \ldots, s\_est_{jK}]$, where $s\_est_{jk}$ is an estimation signal for $s^c_{jk}$. Finally, the low-frequency signal $S\_est_j$ is demodulated by the coding/decoding unit 13.j, which yields the signal $S^D\_est_j$. The signal $S^D\_est_j$ is equal, or approximately equal, to $S_j$, j= 1, ..., M. So, the wireless data communication system of FIG. 3 comprises M simultaneous communication channels at each of the K frequencies, wherein information is transmitted in parallel.

The wireless data communication system of FIG. 3 can also be used for downlink. In that case all arrows shown in FIG. 3 have to be reversed in an analogous way as has been carried out in FIG. 2 with respect to FIG. 1. So, also for downlink, use can be made of a frequency-band in combination of OFDM.

In accordance with the provisions of the patent statutes, the present invention has been described in what is considered to represent its preferred embodiments. However, it should be noted that the invention can be practised otherwise than as specifically illustrated and described without departing from its spirit or scope. For instance, it is thinkable that one uses not only one wireless data communication systems (comparable with the one described in FIGS. 1, 2) but a multiple of these systems for being able to operate on a frequency-band instead of just one frequency. A special, very efficient, example of such a system is the embodiment of the system described in FIG. 3. Moreover, for systems which operate on a frequency-band it is thinkable that these systems dispose over an algorithm for establishing radiofrequencies for which the signal has the least attenuation for a specific travel-path. It is then preferable to transmit on these frequencies. Furthermore, it is clear that the described systems can be used by one or by more than one user. If the system is used by just one user, then this user can dispose over a very high communication capacity. Mostly, the increased system capacity will be used to serve multiple users, with the possibility that some user(s) dispose over more than one antenna and/or sets.

Furthermore, the system according to the FIGS. 1-3 can also be reduced to a simplex communication system. For example the transmitter- and receiver-units 10.$i$ may be replaced by transmit-units ($i$=1, 2, ..., N) and the transmitter- and receiver-units 18.$j$ may be replaced by receive-units 18.$j$ ($j$=1, 2, ..., M). If N=$k_1$ and M=$k_2$ with $k_1$>$k_2$ the first sets 6.$i$ are first groups 6.$i$ for transmission only and the second sets 14.$j$ are second groups 14.$j$ for receiving only. Hence M=$k_2$ simplex communication channels are formed. Alternatively, the transmitter- and receiver-units 10.$i$ may be replaced by receiver-units 10.$i$ ($i$=1, 2, ..., N) and the transmitter- and receiver-units 18.$j$ may be replaced by transmitter-units 18.$j$ (=1, ..., M). If N=$k_2$ and M=$k_1$ with $k_1$<$k_2$ the first sets 6.$i$ are second groups 6.$i$ for receiving only and the second sets 16.$j$ are first groups 16.$j$ for transmission only ($j$=1, 2, ..., M). Hence M=$k_1$ simplex communication channels are formed. Each of the above systems can also be combined with the OFDM techniques as discussed in relation with FIG. 3.

We claim:

1. A method for transmitting an information signal in a multiple antenna
   communication system, comprising the steps of:
   separating said information signal into K signals;
   performing an Inverse Fast Fourier Transformation on said K signals to generate a signal comprising K different frequencies; and
   transmitting said signal comprising K different frequencies on only one antenna.

2. The method of claim 1, wherein said signal comprising K different frequencies has a lower information rate than said information signal.

3. The method of claim 1, wherein a receiver processes a received version of said signal comprising K different frequencies based on transfer functions from each of a plurality of transmit antennas to each of a plurality of receive antennas.

4. The method of claim 3, wherein said transfer functions are determined by a geometry of a configuration of the multiple antenna communication system, wherein each of said transfer functions is associated with a different travel-path between an antenna of a first set of transmitters and an antenna of a receiver.

5. The method of claim 3, wherein said transfer functions are expressed as a complex number, wherein an amplitude of one of said complex numbers is an attenuation of a strength of a signal and wherein a phase of one of said complex numbers is a phase modulation incurred during transmission along a travel path.

6. The method of claim 1, further comprising the step of cyclically extending a symbol interval with a guard interval that is larger than an associated delay spread.

7. The method of claim 1, wherein said communication system is an OFDM communication system.

8. The method of claim 1, wherein said separating step is performed by a serial-to-parallel converter.

9. The method of claim 1, further comprising the step of applying a Forward Error Correction to said information signal.

10. A method for receiving a signal comprising K different frequencies on at least N of antennas in a multiple antenna communication system, comprising the steps of:
    receiving said signal comprising K different frequencies on said at least N receive antennas, where N is greater than one;
    applying a Fast Fourier Transformation to each of said at least N received versions of said signal comprising K different frequencies to generate N*K low frequency signals; and
    combining said N*K separate low frequency signals to recover a transmitted information signal, based on one or more transfer functions from each of a plurality of transmit antennas to each of said N receive antennas.

11. The method of claim 10, wherein said combining step further comprises the steps of a least squares estimation and parallel to serial conversion.

12. The method of claim 10, wherein said signal comprising K different frequencies has a lower information rate than said information signal.

13. The method of claim 10, wherein said transfer functions are determined by a geometry of a configuration of the multiple antenna communication system, wherein each of said transfer functions is associated with a different travel-path between an antenna of a first set of transmitters and an antenna of a receiver.

14. The method of claim 10, wherein said transfer functions are expressed as a complex number, wherein an amplitude of one of said complex numbers is an attenuation of a strength of a signal and wherein a phase of one of said complex numbers is a phase modulation incurred during transmission along a travel path.

15. The method of claim 10, wherein said communication system is an OFDM communication system.

16. The method of claim 10, wherein a number of antennas in a transmitter is different than said number N of receive antennas.

17. A mobile station for transmitting an information signal in a multiple antenna communication system, comprising the steps of:
    a serial-to-parallel unit for separating said information signal into K signals;
    an Inverse Fast Fourier Transformation stage for generating a signal comprising K different frequencies based on said K signals; and
    an antenna for transmitting said signal comprising K different frequencies, wherein said signal comprising K different frequencies is transmitted on only one antenna.

18. The mobile station of claim 17, wherein a receiver processes a received version of one or more of said corresponding output signals based on transfer functions from each of a plurality of transmit antennas to each of a plurality of receive antennas.

19. The mobile station of claim 17, wherein said communication system is an OFDM communication system.

20. A system for receiving a signal comprising K different frequencies on at least N of antennas in a multiple antenna communication system, comprising:
    at least N receive antennas for receiving said signal comprising K different frequencies, where N is greater than one;
    a Fast Fourier Transformation stage for generating N*K low frequency signals based on each of said at least N received versions of said signal comprising K different frequencies; and
    means for combining said N*K separate low frequency signals to recover a transmitted information signal, based on one or more transfer functions from each of a plurality of transmit antennas to each of said N receive antennas.

21. The system of claim 20, wherein said means for combining further comprises a least squares estimation circuit and parallel to serial converter.

22. The system of claim 20, wherein said signal comprising K different frequencies has a lower information rate than said information signal.

23. The system of claim 20, wherein said transfer functions are determined by a geometry of a configuration of the multiple antenna communication system, wherein each of said transfer functions is associated with a different travel-path between an antenna of a first set of transmitters and an antenna of a receiver.

24. The system of claim 20, wherein said transfer functions H are expressed as a complex number, wherein an amplitude of one of said complex numbers is an attenuation of a strength of a signal and wherein a phase of one of said complex numbers is a phase modulation incurred during transmission along a travel path.

25. The system of claim 20, wherein said communication system is an OFDM communication system.

26. The system of claim 20, wherein a number of antennas in a transmitter is different than said number N of receive antennas.

* * * * *